Oct. 3, 1961 W. E. SIMPSON 3,003,098
WINDSCREEN WIPER ACTUATOR MECHANISMS
Filed Nov. 15, 1956 2 Sheets-Sheet 1
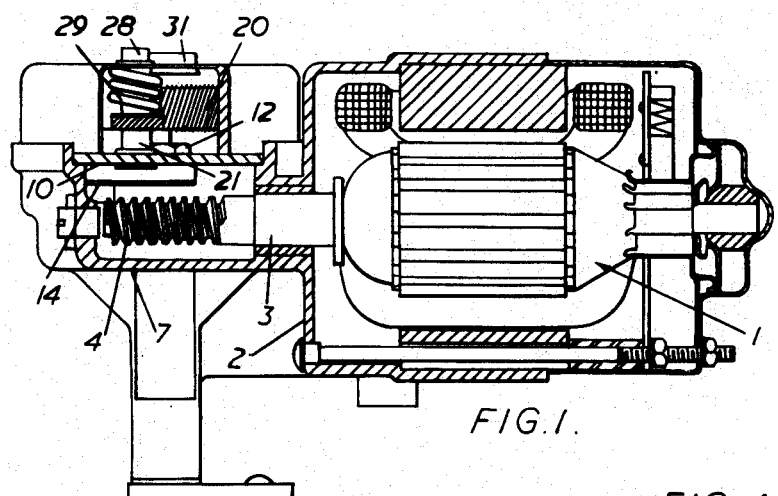
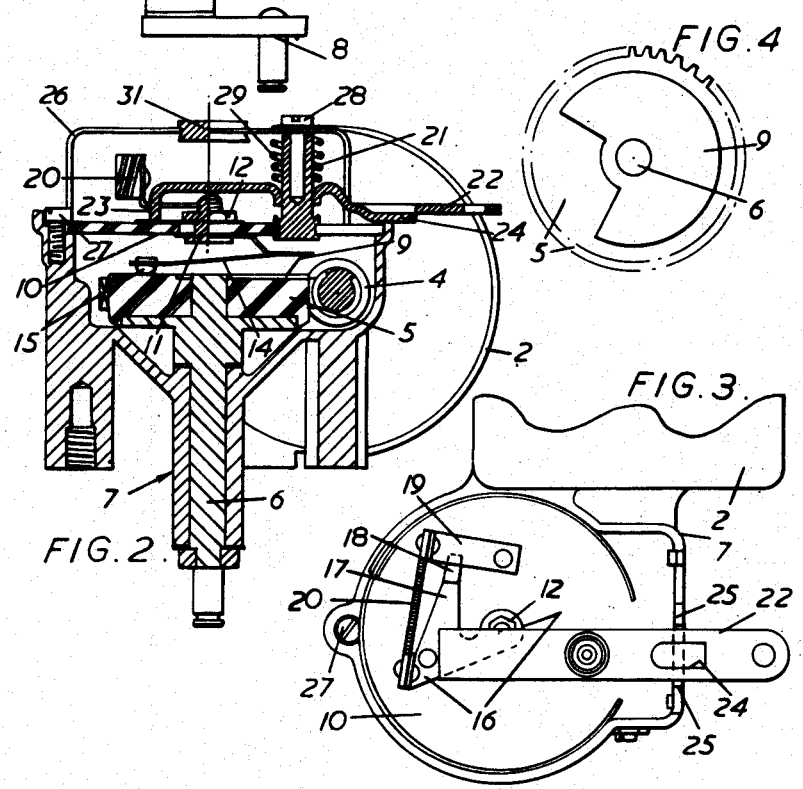
Inventor
WILLIAM E. SIMPSON
By G. H. Strickland
Attorney

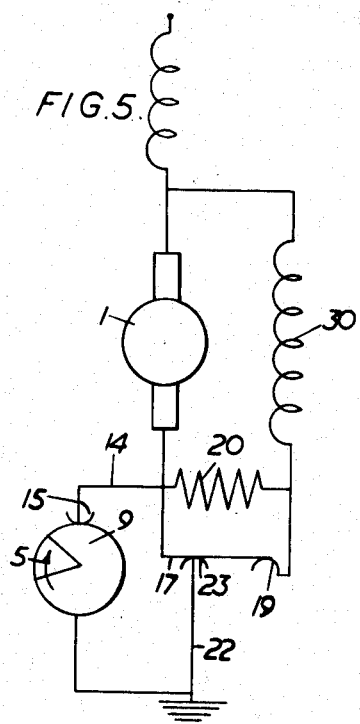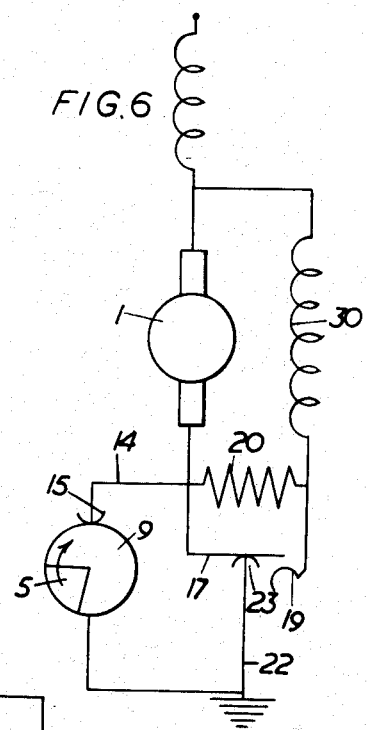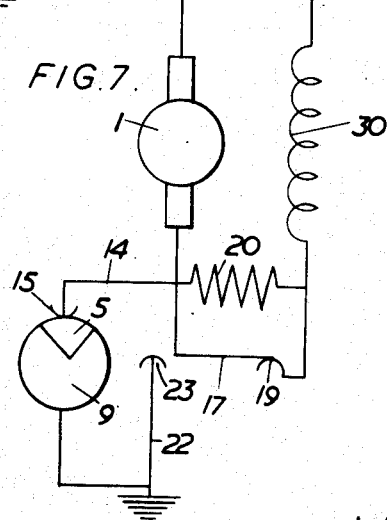

United States Patent Office 3,003,098  
Patented Oct. 3, 1961

3,003,098  
WINDSCREEN WIPER ACTUATOR MECHANISMS  
William E. Simpson, Mill Hill, London, England, assignor to General Motors Corporation, Detroit, Mich., a corporation of Delaware  
Filed Nov. 15, 1956, Ser. No. 622,306  
Claims priority, application Great Britain Nov. 24, 1955  
11 Claims. (Cl. 318—466)

This invention relates to electrically operated windscreen wiper actuator mechanisms and control means therefor.

By the invention an electrically driven windscreen wiper actuator mechanism may be controlled so that when switched off the wiper blades will be brought to rest in a "parked" position; and the electric motor may also be controlled so as to operate the wiper blades at high or low speed as required.

Accordingly the actuator mechanism for an electric windscreen wiper includes an electric motor to drive a wiper actuator shaft, and a switch having a movable contact which is embodied in a gear wheel for rotating said actuator shaft, and a fixed contact. The gear is formed as a circular metal disc a sector of which is replaced by a sector of insulating material. Conveniently the gear wheel is made of insulating material, for example, nylon or other suitable synthetic plastic material, and has said disc secured thereto, the arrangement being such that the place of the removed sector is occupied by a raised portion of the end face of the gear wheel which lies flush with the metal disc.

The fixed contact of the switch is preferably mounted on a resilient arm so as to be urged into contact with the end face of the gear wheel and, during the rotation of the latter, make successive contact with a peripheral portion of the metal plate and the segment of the insulating material lying flush therewith.

By placing said switch in parallel with a further manually operable switch for the motor the latter may be caused to stop with the actuator shaft in a position corresponding to the parked position of the wiper blades, irrespective of the position of the blades when the manual switch is operated.

In order to obtain two speed operation of the wiper motor a compound wound electric motor is employed and said manually operable switch is arranged to shunt a resistance connected in series with the motor shunt field winding.

The manual switch has three positions. In the first "off" position the motor circuit to earth is broken; in the second, "low speed," position the motor has a circuit to earth but the resistance is shunted by the switch; and in the third, "high speed" position the shunt connection of the resistance is broken and the motor is connected to earth through the resistance.

The scope of the invention is defined by the appended claims; and how it can be performed is hereinafter particularly described, with reference to the accompanying drawings in which:

FIG. 1 is a sectional elevation of a windscreen wiper actuator mechanism according to the invention;

FIG. 2 is a vertical section through the drive gearing and control switches of the mechanism, viewed from the left of FIG. 1;

FIG. 3 is a plan of FIG. 2 with a cover plate removed to show the manual control switch;

FIG. 4 is a detail in plan, of the worm wheel on the wiper actuator shaft of the mechanism; and FIGS. 5 to 7 are circuit diagrams illustrating the operation of the mechanism in "slow speed," "high speed" and "off" conditions respectively.

In the mechanism shown in FIGS. 1 to 4 a compound wound electric motor 1 is mounted in a metal housing 2 in which the motor drive shaft 3 is journaled, one end of the shaft 3 being formed with a worm 4 which drives a worm wheel 5 in the form of an annulus, secured on one end of a wiper actuator shaft 6 which is journaled in an extension 7 of the motor housing 2 and carries at its other end a crank 8 for actuation of a pair of wiper blades (not shown) in known manner.

The worm wheel 5 is made of synthetic plastic material, such as nylon, and inset flush with one face thereof is a metal disc 9 from which a 90° sector has been removed (FIGS. 2 and 4). The disc 9 may be conveniently secured to the nylon worm wheel 5 during the formation of the latter by moulding. The metal disc 9 has electrical connection with the actuator shaft 6 and, accordingly, the motor housing 2, which is normally connected to earth when the windscreen wiper is installed in a vehicle.

Mounted parallel to and spaced from the end face of the worm wheel 5 and the metal disc 9 is a plate 10 of insulating material adapted to be secured to the housing extension 7 so as to seal the latter and enclose the worm wheel 5 and worm gear 4. Fastened centrally to the underside of the plate 10 by a bolt 11 passing therethrough and secured on the other side by a nut 12 is one end of a resilient metal arm 14 the other end of which carries a contact 15 which is constantly urged in engagement with a peripheral portion of the metal disc 9. Thus, the mutilated metal disc 9 on the worm wheel 5 forms the movable contact, and the resilient arm 14 and contact 15 the fixed contact of a switch.

On the upper side of the plate 10 there is secured by said nut 12 one end 16 of a resilient metal contact member 17 which is thus electrically connected with the resilient arm 14 on the other side of the plate 10. The free end 18 of this contact member 17 is normally in connection with a fixed contact member 19 fixed to the plate 10; and a resistance 20 is connected at one end to the fixed contact member 19 and at its other end to the resilient contact member 17.

Mounted at right angles to the plate 10 near the periphery thereof is a pivot pin 21 for a manually operable control lever 22 having at one end thereof a bent-over portion 23 and at the other end a stop member 24 which is pressed out therefrom and adapted to engage in any one of three recesses 25 formed at the edge of the housing extension 7. A cover plate 26 for the contact members 17, 19, resistance 20 and control lever 22 is secured to the housing extension 7 by a screw 27 at the periphery of the housing extension 7 and a further screw 28 which passes through the top of the plate 26 and is threaded into the pivot pin 21. A helical spring 29 mounted on the pin 21 abuts at its upper and lower ends respectively against the plate 26 and the lever 22, the bent-over end 23 of the latter thus being urged into contact with the insulator plate 10 and the resilient contact member 17 mounted thereon. The stop member 24 at the other end of the lever 22 is urged into engagement with the said recesses 25 so as to hold the bent-over end 23 of the lever 22 in a desired position relative to the contact 17 on said plate 10. In one extreme position of the control lever 22 the bent-over end 23 thereof engages the insulator plate 10; in a second, central position it engages the fixed end 16 of the resilient contact member 17; and in a third extreme position it engages the free end 18 of the resilient contact member 17 and depresses it out of engagement with the fixed contact member 19.

The manually operable lever 22 is connected to earth by contact with the housing extension 7, and the resilient contact member 17 and the fixed contact member 19 are connected in series with the shunt winding 30 (FIGS.

5 to 7) of the electric motor 1, and one to each end of the resistance 20. Thus the resistance 20, which is in series with the shunt winding 30 of the motor, may be shunted by the resilient and fixed contact members 17 and 19.

The resilient contact member 17 is also connected as stated, to the resilient arm 14 on the other side of said plate.

In operation, when the motor 1 is connected to a suitable source of electric current the drive shaft 3 rotates and the worm wheel 5 is rotated by the worm gear 4 on the end of the drive shaft 3. During each rotation of the worm wheel 5 the contact 15 of the resilient arm 14 in engagement therewith makes contact successively with a peripheral portion of the metal disc 9 and with the 90° sector of the nylon wheel 5, so that a circuit to earth through the resilient arm 14, the metal disc 9, the actuator shaft 6 and the motor housing 2, 7 is interrupted during each revolution of the worm wheel 5. Assuming that the manually operable control lever 22 is in a position in which the bent-over end 23 thereof is in contact with the fixed end 16 of the resilient contact member 17, which is connected to the resilient arm 14 on the other side of the plate 10 (FIG. 5), then the motor 1 will rotate at slow speed since the resistance 20 is shunted by the contact between the resilient contact member 17 and the fixed contact member 19, and although a circuit to earth from one end of the resistance 20 and the motor 1 is interrupted during each revolution of the worm wheel 5 as the nylon sector thereon makes contact with the resilient arm 14, the motor 1 continues to operate since a circuit to earth therefrom is completed through the fixed contact member 19, the resilient contact member 17, the manually operable control lever 22 and the earthed motor housing 2, 7.

When it is desired to operate the motor at high speed, the control lever 22 is moved to the one extreme position (FIG. 6), in which its end 23 disengages the free end 18 of the resilient contact member 17 from the fixed contact member 19. In this position also, the motor 1 is not stopped by the interruption of the circuit to earth during each revolution of the worm wheel 5, but the resistance 20 is placed in series with the shunt winding 30 of the motor 1.

When the control lever 22 is in the other extreme position (FIG. 7) in which it is completely disengaged from the resilient contact member 17, then the motor 1 has a circuit to earth only when the contact 15 of the resilient arm 14 on the underside of the plate 10 is in engagement with the metal disc 9 carried on the worm wheel 5. When however, during continued rotation of the latter, the contact 15 of the arm 14 is brought into engagement with the 90° segment of the nylon worm wheel, then the circuit to the motor 1 is interrupted and the motor stops. By adjustment of the angular position of the arm 14 relative to the actuator shaft 6 at which this interruption of the circuit takes place, it is possible to ensure that the motor 1 is stopped when the wipers operated thereby are in their parked position on the windscreen of the vehicle on which they are mounted. Such adjustment may be effected by providing an access opening, normally closed by a removable plug 31 in the cover plate 26, a tool being introduced through the opening to slacken the nut and rotate the resilient arm 14 relative to the worm wheel 5.

The manually operable control lever 22 and the resilient and fixed contact members 17, 19 can be replaced by a three position switch mounted remote from the motor appropriately connected to the motor 1 and the resilient arm 14 and resistance 30. The resistance 30 may also be mounted remote from the motor 1.

I claim:

1. A windscreen wiper actuator mechanism comprising an electric motor having a drive shaft journaled for rotation in a housing for said motor, a driven wiper actuator shaft journaled for rotation in said housing, gears interconnecting said drive and driven shafts, a first switch connected in circuit with said motor to control the operation thereof when said motor is connected with an electrical supply, and a second switch interposed in said circuit and comprising a movable contact carried by one of said gears, and a fixed contact engageable with said movable contact, but electrically disconnected therefrom in a predetermined position of rotation of said wiper actuator shaft.

2. A windscreen wiper actuator mechanism comprising an electric motor having a drive shaft journaled for rotation in a housing for said motor, a driven wiper actuator shaft journaled for rotation in said housing, gears including a worm and a worm wheel interconnecting said drive and driven shafts, a first manually operable switch connected in circuit with said motor to control the operation thereof when said motor is connected with an electrical supply, and a second switch interposed in said circuit and comprising a movable contact embodied in said worm wheel, and a fixed contact engageable with said movable contact, but electrically disconnected therefrom in a predetermined position of rotation of said wiper actuator shaft.

3. A windscreen wiper actuator mechanism comprising an electric motor, a housing for said motor, a drive shaft journaled in said housing for rotation by said motor, a driven wiper actuator shaft journaled for rotation in said housing, a gear on said drive shaft in mesh with a gear on said driven shaft, a first switch connected in circuit with said motor to control the operation thereof when said motor is connected to an electric supply, a second switch connected in parallel with said first switch and having a movable contact formed as a metal disc carried by the gear on said driven shaft, said disc having a sector thereof replaced by a sector of insulating material flush therewith, and a fixed contact engageable with said disc on rotation of said driven gear so as to make successive contact with a peripheral portion of said disc and said sector of insulator material, said fixed contact being angularly adjustable relative to said disc so as to open said second switch at a predetermined position of rotation of the driven shaft.

4. A windscreen wiper actuator mechanism comprising an electric motor, a housing for said motor, a drive shaft journaled in said housing for rotation by said motor, a driven wiper actuator shaft journaled for rotation in said housing, a gear on said drive shaft in mesh with a nylon gear on said driven shaft, a first manually operable switch connected in circuit with said motor to control the operation thereof when said motor is connected to an electric supply, a second motor operated switch connected in parallel with said first switch and having a movable contact formed as a metal disc inset in said nylon gear, said disc having a sector thereof replaced by a sector of the nylon of said gear lying flush therewith, and a fixed contact resiliently biased into engagement with said disc and adapted on rotation of said nylon gear to make successive contact with a peripheral portion of said disc and the sector of nylon lying flush therewith, said fixed contact being angularly adjustable relative to said disc so as to open said second switch at a predetermined position of rotation of the driven shaft.

5. A windscreen wiper actuator mechanism comprising a compound wound electric motor, a housing for said motor, a drive shaft journaled in said housing for rotation by said motor, a driven wiper actuator shaft journaled for rotation in said housing, a worm on said drive shaft in mesh with a nylon worm wheel on said driven shaft, a first switch connected in circuit with said motor and a resistance to effect motor de-energisation or motor operation at high or low speed, a second switch connected in parallel with said first switch and having a movable contact formed as a mutilated metal disc inset in an end face of said nylon worm wheel said disc having the place of a sector thereof occupied by a sector of the nylon worm wheel flush therewith, and a fixed contact resiliently engaged with said disc so as on rotation of said worm wheel to make successive contact with a peripheral portion of said disc and said nylon sector, said fixed contact being angularly adjustable relative to said disc so as to open said second switch at a predetermined position of rotation of the driven shaft.

6. A windscreen wiper actuator mechanism according to claim 3 in which the gear on said driven shaft is made at least partly of insulating material and said metal disc is inset in an end face of said gear flush with said insulating material.

7. A windscreen wiper actuator mechanism according to claim 5, in which said first switch has a fixed contact and a movable contact resiliently engaged therewith, and a manually operable lever connected in said circuit is movable to a first position disengaged from said movable contact, a second position in which said movable contact is engaged therewith but disengaged from said fixed contact, and a third position in which said movable contact is engaged therewith and with said fixed contact, said resistance bridging said fixed and movable contacts.

8. In a windscreen wiper mechanism operable by an electric motor, a switch to interrupt a control circuit for the motor when a wiper actuator shaft driven by the motor is in position corresponding to a parked position of the wiper blades, comprising: a movable contact formed as a metal disc mounted on said wiper actuator shaft for rotation therewith, said disc having a sector thereof replaced by a sector of insulating material; and a fixed contact resiliently urged into engagement with said disc so as on rotation thereof successively to make contact with a peripheral portion of said disc and a peripheral portion of said sector of insulator material.

9. The windscreen wiper actuator mechanism set forth in claim 1 wherein one of said fixed and movable contacts comprises a metal disc having a sector thereof replaced by a sector of insulating material.

10. The windscreen wiper actuator mechanism set forth in claim 9 wherein said sector of insulating material subtends an angle of substantially 90°.

11. The windscreen wiper actuator mechanism set forth in claim 9 wherein said metal disc is mounted on an annulus of insulating material, and wherein said sector of insulating material is flush with the surface of said disc and is integral with said annulus.

References Cited in the file of this patent

UNITED STATES PATENTS

| | | |
|---|---|---|
| 2,259,790 | Auten | Oct. 21, 1941 |
| 2,357,152 | Whitted | Aug. 29, 1944 |
| 2,453,251 | Newman | Nov. 9, 1948 |